(12) United States Patent
Yi et al.

(10) Patent No.: US 11,695,605 B2
(45) Date of Patent: *Jul. 4, 2023

(54) METHOD AND APPARATUS FOR PERFORMING INITIAL ACCESS IN WIRELESS COMMUNICATION SYSTEM

(71) Applicant: LG Electronics Inc., Seoul (KR)

(72) Inventors: Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

This patent is subject to a terminal disclaimer.

(21) Appl. No.: 17/168,976

(22) Filed: Feb. 5, 2021

(65) Prior Publication Data
US 2021/0160120 A1 May 27, 2021

Related U.S. Application Data

(63) Continuation of application No. 16/064,817, filed as application No. PCT/KR2018/004347 on Apr. 13, 2018, now Pat. No. 10,944,613.
(Continued)

(30) Foreign Application Priority Data
Apr. 13, 2018 (KR) .......................... 10-2018-0043227

(51) Int. Cl.
*H04L 27/26* (2006.01)
*H04L 5/00* (2006.01)
*H04W 72/0453* (2023.01)

(52) U.S. Cl.
CPC ........ *H04L 27/2613* (2013.01); *H04L 5/0048* (2013.01); *H04L 27/2659* (2013.01); *H04W 72/0453* (2013.01); *H04L 27/26136* (2021.01)

(58) Field of Classification Search
None
See application file for complete search history.

(56) References Cited

U.S. PATENT DOCUMENTS 10,944,613 B2 * 3/2021 Yi ........................ H04L 27/2659
2011/0170435 A1   7/2011 Kim et al.
(Continued)

FOREIGN PATENT DOCUMENTS

| CN | 101931485 | 12/2010 |
|---|---|---|
| CN | 102036262 | 4/2011 |

(Continued)

OTHER PUBLICATIONS

Huawei, HiSilicon, "On numerology determination during initial access," R1-1704194, Presented at 3GPP TSG RAN WG1 Meeting #88bis, Spokane, USA, Apr. 3-7, 2017, 4 pages.
(Continued)

*Primary Examiner* — Xavier S Wong
(74) *Attorney, Agent, or Firm* — Fish & Richardson P.C.

(57) ABSTRACT

Provided are a method and an apparatus for performing physical resource block (PRB) indexing in a wireless communication system. A user equipment (UE) receives information on an offset between a synchronization signal (SS) block and a system bandwidth from a network through the SS block and performs the PRB indexing on the system bandwidth on the basis of the information on the offset.

18 Claims, 11 Drawing Sheets

Related U.S. Application Data

(60) Provisional application No. 62/485,865, filed on Apr. 14, 2017, provisional application No. 62/516,120, filed on Jun. 7, 2017, provisional application No. 62/560,167, filed on Sep. 18, 2017, provisional application No. 62/564,209, filed on Sep. 27, 2017, provisional application No. 62/572,534, filed on Oct. 15, 2017, provisional application No. 62/630,243, filed on Feb. 14, 2018.

(56) References Cited

U.S. PATENT DOCUMENTS

| | | | |
|---|---|---|---|
| 2012/0033643 | A1 | 2/2012 | Noh et al. |
| 2015/0208208 | A1 | 7/2015 | You et al. |
| 2016/0037516 | A1 | 2/2016 | Seo et al. |
| 2017/0245278 | A1* | 8/2017 | Xue ................... H04W 72/0453 |
| 2017/0373902 | A1 | 12/2017 | Zhang et al. |
| 2018/0098361 | A1* | 4/2018 | Ji ...................... H04W 74/0866 |
| 2018/0139778 | A1* | 5/2018 | Chou ................... H04W 74/04 |
| 2018/0167946 | A1 | 6/2018 | Si et al. |
| 2018/0192383 | A1* | 7/2018 | Nam .................... H04W 72/12 |
| 2018/0198648 | A1 | 7/2018 | Sun et al. |
| 2018/0270771 | A1* | 9/2018 | Chendamarai Kannan .................  H04L 27/2675 |
| 2018/0302889 | A1 | 10/2018 | Guo et al. |
| 2019/0380099 | A1 | 12/2019 | Hakola et al. |
| 2020/0067754 | A1 | 2/2020 | Jung et al. |
| 2020/0092946 | A1* | 3/2020 | Xiong ................... H04L 5/0094 |
| 2020/0244503 | A1 | 7/2020 | Bala et al. |

FOREIGN PATENT DOCUMENTS

| | | |
|---|---|---|
| WO | WO2017039372 | 3/2017 |
| WO | WO2017039373 | 3/2017 |
| WO | WO2017053024 | 3/2017 |

OTHER PUBLICATIONS

Office Action in Korean Appln. No. 10-2019-0050080, dated Feb. 10, 2022, 8 pages (with English translation).
CATT, "Transmission scheme and DMRS of NR PBCH," R1-1717461, 3GPP TSG RAN WG1 Meeting #89, Hangzhou, P.R, China, May 15-19, 2017, 6 pages.
Huawei, HiSilicon, "Overview of wider bandwidth operations," R1-1709972, 3GPP TSG RAN WG1 NR Ad Hoc Meeting, Qingdao, China, Jun. 27-30, 2017, 9 pages.
Korean Office Action in Korean Appln. No. 10-2019-0050080, dated Mar. 26, 2021, 11 pages (with English translation).
LG Electronics, "Remaining issues on bandwidth parts," R1-1719935, 3GPP TSG RAN WG1 Meeting 91, Reno, USA, Nov. 27-Dec. 1, 2017, 7 pages.
MCC Support, "Final Report of 3GPP TSG RAN WG1 #AH_NR3 v1.0.0, (Nagoya, Japan, Sep. 18-21, 2017," R1-1716942, Prague, Czech Republic, Oct. 9-13, 2017, 104 pages.
ETRI, "UE bandwidth configuration during initial access," R1-1710622, Presented at 3GPP TSG RAN WG1 NR Ad-Hoc#2, Qingdao, China, Jun. 27-30, 2017, 5 pages.
Office Action in Korean Appln. No. 10-2019-0050080, dated Oct. 12, 2121, 8 pages (with English translation).
CATT, "NR PBCH and NR physical channel carried system information," R1-1700182, 3GPP TSG RAN WG1 AH NR Meeting, Spokane, USA, dated Jan. 16-20, 2017, 5 pages.
CN Notice of Allowance in Chinese Appln. No. 201880028769.0, dated Nov. 10, 2020, 6 pages (with English translation).
CN Office Action in Chinese Appln. No. 2018890028769.0, dated Jul. 3, 2020, 15 pages (with English translation).
Ericsson, "Measurement configuration for A1-A6 events," R2-1702800, 3GPP TSG-RAN WG2 #97bis, Spokane, USA, dated Apr. 3-7, 2017, 5 pages.
Ericsson, "NB-IoT—NB-MIB content and design considerations," St. Julian, Malta, dated Feb. 15-19, 2016, 5 pages.
Extended European Search Report in European Application No. 18785078.9, dated Mar. 11, 2020, 13 pages.
Huawei, "Frequency location of the synchronization signals," R1-1795953, 3GPP TSG RAN WG1 Meeting #88bis, Spokane, USA, dated Apr. 3-7, 2017, 10 pages.
Huawei, HiSilicon, "BWP issues for EN-DC completion," R2-1712322, 3GPP TSG-RAN WG2 Meeting #100, Reno, USA, dated Nov. 27-Dec. 1, 2017, 5 pages.
Huawei, HiSilicon, "Coexistence of different UE types on a wideband carrier," R1-1715570, 3GPP TSG RAN WG1 Meeting NR#3, Nagoya, Japan, dated Sep. 18-21, 2017, 6 pages.
Huawei, HiSilicon, "Coexistence of different UE types on a wideband carrier," R1-1713733, 3GPP TSG RAN WG1 Meeting #90, Prague, Czech Republic, dated Aug. 21-25, 2017, 6 pages.
Intel Corporation, "On the remaining details of DM-RS," R1-1716300, 3GPP TSG RAN WG1 Meeting NR #3, Nagoya, Japan, dated Sep. 18-21, 2017, 17 pages.
JP Office Action in Japanese Appln. No. 2019-555863, dated Jan. 5, 2021, 8 pages (with English translation).
LG Electronics, "Discussion on wideband operation," R1-1704937, 3GPP TSG RAN WG1 Meeting #88bis, Spokane, USA, dated Apr. 3-7, 2017, 6 pages.
LG Electronics, "RMSI delivery and CORESET configuration," R1-1715842, 3GPP TSG RAN WG1 Meeting NR#3, Nagoya, Japan, dated Sep. 18-21, 2017, 7 pages.
MediaTek Inc., "Broadcast channel design for system information acquisition," Spokane, USA, dated Jan. 16-20, 2017, 6 pages.
Nokia, Nokia Shanghai Bell, "Remaining details on NR-PBCH," R1-1716524, 3GPP TSG-RAN WG1 NR AH#3, Nagoya, Japan, dated Sep. 18-21, 2017, 13 pages.
NTT Docomo, Inc., "Discussion and evaluation on NR-PBCH design," R1-1705708, 3GPP TSG RAN WG1 Meeting #88bis, Spokane, USA, dated Apr. 3-7, 2017, 7 pages.
Panasonic, "Discussion on frequency domain frame structure for NR," R1-1609815, 3GPP TSG RAN WG1 Meeting #86bis, Lisbon, Portugal, dated Oct. 10-14, 2016, 6 pages.
Samsung, "SS BW and multiplexing," Spokane, USA, dated Jan. 16-20, 2017, 9 pages.
Office Action in U.S. Appl. No. 18/080,157, dated Mar. 10, 2023, 17 pages.

* cited by examiner

METHOD AND APPARATUS FOR PERFORMING INITIAL ACCESS IN WIRELESS COMMUNICATION SYSTEM

CROSS-REFERENCE TO RELATED APPLICATIONS

This application is a continuation of U.S. application Ser. No. 16/064,817, filed on Mar. 25, 2019, which is a National Stage application under 35 U.S.C. § 371 of International Application No. PCT/KR2018/004347, filed on Apr. 13, 2018, which claims the benefit of U.S. Provisional Application No. 62/485,865, filed on Apr. 14, 2017, U.S. Provisional Application No. 62/516,120, filed on Jun. 7, 2017, U.S. Provisional Application No. 62/560,167, filed on Sep. 18, 2017, U.S. Provisional Application No. 62/564,209, filed on Sep. 27, 2017, U.S. Provisional Application No. 62/572,534, filed on Oct. 15, 2017, U.S. Provisional Application No. 62/630,243, filed on Feb. 14, 2018, and Korean Application No. 10-2018-0043227, filed on Apr. 13, 2018. The disclosures of the prior applications are incorporated by reference in their entirety.

BACKGROUND OF THE INVENTION

Field of the Invention

The present invention relates to wireless communication and, more particularly, to a method for performing an initial access in a wireless communication system and an apparatus thereof.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more communication devices require great communication capacity, a demand with respect to enhanced mobile broadband (eMBB) communication is spotlighted. Further, there is a main issue that a plurality of devices and objects are connected so that large machine type communication (MTC) providing various services regardless of time and location to be considered as next generation communication. Further, ultra-reliable and low latency communication (URLLC) considering service/user equipment (UE) sensitive to reliability and delay has been discussed. As described above, introduction of a next generation radio access technology considering eMBB, a large MTC, URLLC has been discussed. For convenience of the description, such new radio access technology may refer to a new radio access technology (NR).

A wavelength is short in a millimeter wave (mmW) so that a plurality of antennas may be installed at the same area. For example, the wavelength is 1cm at a 30 GHz band, total 100 antenna elements may be installed in a secondary arrangement form at $0.5\lambda$ (wavelength) on a panel of 5×5 $cm^2$. Accordingly, a plurality of antenna elements is used at the mmW band so that a beamforming gain is increased to increase coverage or a throughput.

In this case, if a transceiver is included to adjust transmission power and a phase by antenna element, an independent beamforming is possible by frequency resource. However, if transceivers are installed at 100 antenna elements, respectively, the effectiveness is deteriorated in a cost side. Accordingly, it is considered that a plurality of antenna elements are mapped to one transceiver and a direction of a beam are adjusted to an analog phase shifter. Such an analog beamforming scheme can create only one beam direction so that a frequency selective beamforming cannot be performed.

A hybrid beamforming having B transceivers having the number less than Q antenna elements in an intermediate form of digital beamforming and analog beamforming may be considered. In this case, although the number of direction of the beam capable of being simultaneously transmitted is changed according to a connection scheme of B transceivers and Q antenna elements, the number of direction of the beam is limited to less than B.

According to unique characteristics of NR, a structure of a physical channel and/or related characteristics of NR may be different from those of an existing LTE. For an efficient operation of the NR, various schemes may be suggested.

SUMMARY OF THE INVENTION

The present invention provides a method for performing an initial access in a wireless communication system and an apparatus thereof. The present invention discusses a sub-band configuration and an initial access procedure in a case of wideband operation in an NR.

In an aspect, a method for performing a physical resource block (PRB) indexing by a user equipment (UE) in a wireless communication system is provided. The method includes receiving information on an offset between a synchronization signal (SS) block and a system bandwidth from a network through the SS block, and performing the PRB indexing for the system bandwidth based on the information on the offset.

In another aspect, a user equipment (UE) in a wireless communication system is provided. The UE includes a memory, a transceiver, and a processor, operably coupled to the memory and the transceiver, and configured to control the transceiver to receive information on an offset between a synchronization signal (SS) block and a system bandwidth from a network through the SS block, and perform the PRB indexing for the system bandwidth based on the information on the offset.

An initial access of a UE may be efficiently performed in an NR.

DESCRIPTION OF EXEMPLARY EMBODIMENTS

Hereinafter, the following description will be made while focusing on an NR based wireless communication system. However, the present invention is limited thereto. The present invention is applicable to another wireless communication system, for example, 3rd generation partnership project (3GPP) long-term evolution (LTE)/LTE-A (advanced) or institute of electrical and electronics engineers (IEEE) having the same characteristic to be described below.

A 5G system is a 3GPP system including a 5G access network (AN), a 5G core network (CN) and user equipment (UE). The UE may be called other terms such as a mobile station (MS), a user terminal (UT), a subscriber station (SS), or a wireless device. A 5G AN is an access network including a non-3GPP access network and/or a new generation radio access network (NG-RAN) connected to the 5G CN. The NG-RAN is a wireless access network having a common characteristic connected to the 5G CN and for supporting at least one of following options.

1) Independent type new radio (NR).
2) The NR is an anchor having E-UTRA extension.
3) Independent type E-UTRA.
4) An E-UTRA is an anchor having NR extension.

Figure 1:
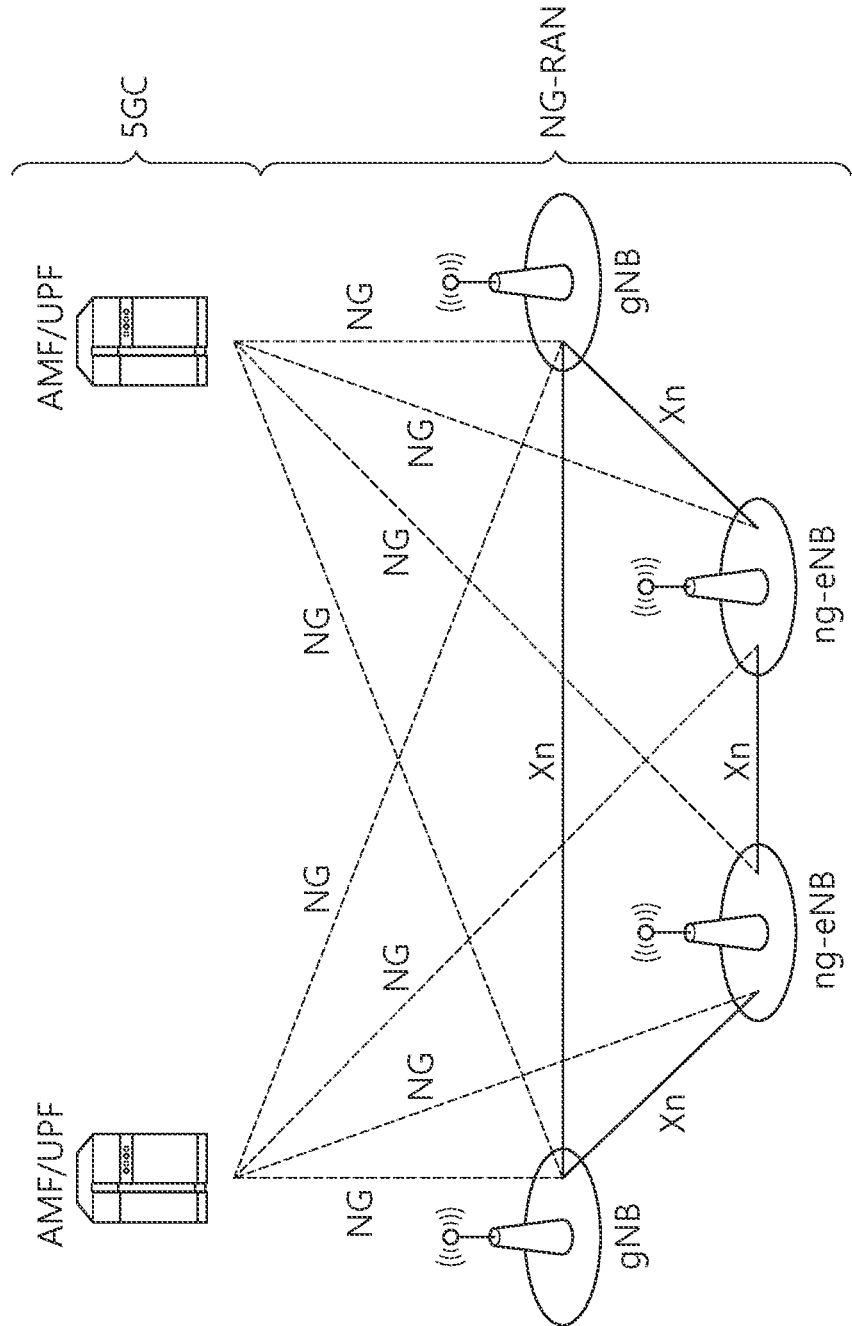
FIG. 1 illustrates a NG-RAN architecture.

FIG. 1 illustrates a NG-RAN architecture. Referring to FIG. 1, the NG-RAN includes at least one NG-RAN node. The NG-RAN node includes at least one gNB and/or at least one ng-eNB. A gNB/ng-eNB may be called a base station (BS) or an access point. A gNB provides an NR user plane and a control plane protocol termination toward the UE. An ng-eNB provides an E-UTRA user plane and a control plane protocol termination toward the UE. A gNB is connected with an ng-eNB through an Xn interface. The gNB and the ng-eNB are connected with the 5G CN through the NG interface. In detail, the gNB and the ng-eNB are connected with an access and mobility management function (AMF) through an NG-C interface, and are connected with a user plane function (UPF) through an NG-U interface.

The gNB and/or ng-eNB host the following functions:

Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
Quality of service (QoS) flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.

The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.

The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.

The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In the NR, a plurality of orthogonal frequency division multiplexing (OFDM) numerologies may be supported. A plurality of numerologies may be mapped to different subcarrier spacings, respectively. For example, a plurality of numerologies mapped to various subcarrier spacings of 15 kHz, 30 kHz, 60 kHz, 120 kHz, and 240 kHz may be supported.

Downlink (DL) transmission and uplink (UL) transmission are configured in a frame having a length of 10 ms in the NR. One frame includes 10 subframes having a length of 1 ms. Each frame is divided into two half-frames having the same size. A half-frame 0 is configured by subframes 0~4. A half-frame 1 is configured by subframes 5~9. In a carrier, one frame group is included on UL and one frame group is included on DL.

A slot is configured by each numerology in the subframe. For example, in a numerology mapped to a subcarrier spacing of 15 kHz, one subframe includes one slot. In a numerology mapped to a subcarrier spacing of 30 kHz, one subframe includes two slots. In a numerology mapped to a subcarrier spacing of 60 kHz, one subframe includes four slots. In a numerology mapped to a subcarrier spacing of 120 kHz, one subframe includes eight slots. In a numerology mapped to a subcarrier spacing of 240 kHz, one subframe includes 16 slots. The number of OFDM symbols per slot may maintain 14. A start point of a slot in the subframe may be arranged in a start point of an OFDM symbol in time.

In the slot, the OFDM symbol may be classified into a DL symbol, a UL symbol, or a flexible symbol. In the DL slot, it may be assumed that DL transmission occurs in only a DL symbol or a flexible symbol. In the UL slot, the UE may perform UL transmission in only the UL symbol or the flexible symbol.

Figure 2:
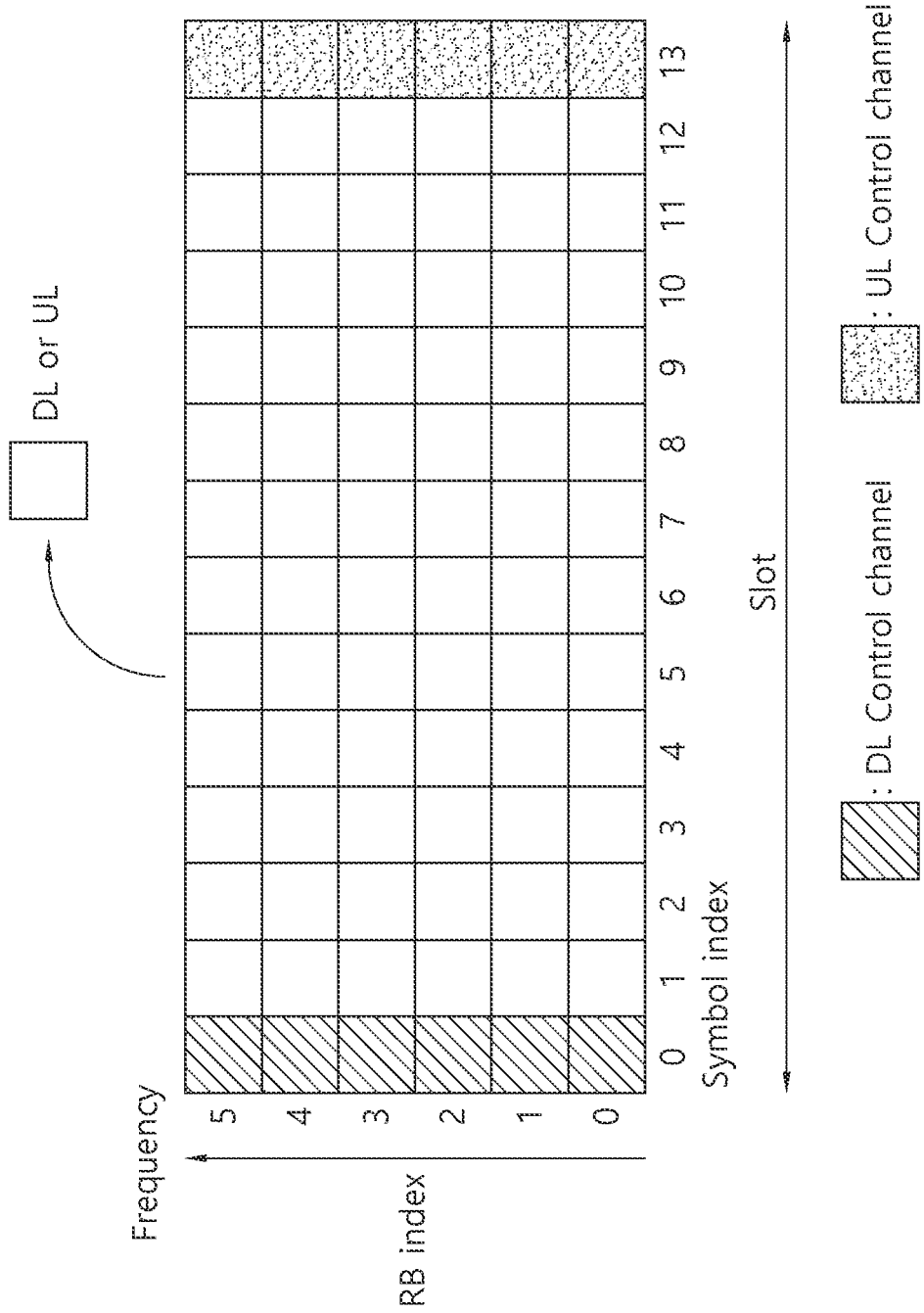
FIG. 2 illustrates an example of a subframe structure in an NR.

FIG. 2 illustrates an example of a subframe structure in an NR. The subframe structure of FIG. 2 may be used in a time division duplex (TDD) of the NR in order to minimize transmission delay of data. The subframe structure of FIG. 2 may be called a self-contained subframe structure.

Referring to FIG. 2, a first symbol of a subframe includes a DL control channel, and a final symbol includes a UE control channel. Symbols from a second symbol to a thirteenth symbol of the subframe may be used for DL data transmission or UL data transmission. As described above, when DL transmission and UL transmission are sequentially performed in one subframe, the UE may receive DL data and transmit UL hybrid automatic repeat request (HARQ)-acknowledgement (ACK) in one subframe. Finally, a time taken for retransmission upon generation of data transmission error may be reduced. Accordingly, transfer delay of final data may be minimized. In such a subframe structure, a base station and the UE may need a gap to convert a transmission mode into a reception mode or from the reception mode into the transmission mode. To this end, a partial symbol of a time point converted from DL to UL in the subframe structure may be configured as a guard period (GP).

A physical channel in the NR is described.

An antenna port is defined so that a channel on which a symbol is transported on the antenna port may be inferred from a channel on which a different symbol is transported on the same antenna port. If a large-scale characteristic of a channel to which a symbol is transferred on one antenna port may be inferred from a channel to which the symbols is transferred on a different antenna port, two antenna ports may have quasi co-located (QCL) relation to each other. The large-scale characteristic includes at least one of delay spread, Doppler diffusion, Doppler shift, average gain, average delay, and space reception parameter.

With respect to each numerology and carrier, a resource grid consisting of a plurality of subcarriers and a plurality of OFDM symbols is defined. The resource grid starts from a specific common resource block indicated by higher layer signaling. There is one resource grid per antenna port, per numerology, and per transmission direction (DL or UL). Per antenna port and per numerology, each element in the resource grid is called resource element (RE).

The resource block (RB) is defined as 12 continuous subcarriers at a frequency domain. A reference RB starts from 0 at a frequency domain to be indexed in a gradually increased direction. A subframe 0 of the reference RB is common in all numerologies. A subcarrier of an index 0 of the reference RB functions as a common reference point with respect to another RB grid. A common RB starts from 0 at a frequency domain with respect to each numerology to be indexed in a gradually increased direction. A subcarrier having an index 0 of a common RB having index 0 corresponds to a subcarrier having index 0 of the reference RB in each numerology. A physical RB (PRB) and a virtual RB are defined in a bandwidth part (BWP), and starts from 0 in the BWP to be indexed in a gradually increased direction.

The BWP is defined as a continuous group of a selected PRB in a continuous group of common RBs in a given carrier and a given numerology. The UE may be configured with maximum 4 BWPs in DL, and only one DL BWP may be activated at a given time point. It is expected that the UE does not receive a physical downlink shared channel (PDSCH), a physical downlink control channel (PDCCH), a channel state information reference signal (CSI-RS) or a tracking RS (TRS) at an outside of an activated BWP. Further, the UE may be configured with maximum 4 BWPs in UL, and only one UL BWP may be activated at a given time point. When the UE is configured with a supplemental UL (SUL), the UE may be configured with maximum 4 BWPs in SUL, and only one UL BWP may be activated at a given time point. The UE cannot transmit a physical uplink shared channel (PUSCH) or a physical uplink control channel (PUCCH) at an outside of an activated BWP.

In a DL transmission scheme at the NR, a closed loop demodulation RS (DM-RS) based spatial multiplexing is supported for a PDSCH. Maximum 8 and 12 orthogonal DL DM-RS ports support type 1 and type 2 DM-RSs, respectively. Maximum 8 orthogonal DL DM-RS ports are supported per UE with respect to single-user multiple-input multiple-output (SU-MIMO). Maximum 4 DL DM-RS ports per UE are supported with respect to multi-user MIMO (MU-MIMO). The number of SU-MIMO code-words is 1 with respect to 1-4 layer transmission and 2 with respect to 5-8 layer transmission.

The DM-RS and a corresponding PDSCH are transmitted using the same pre-coding matrix, and the UE does not need to know a pre-coding matrix in order to demodulate transmission. A transmitter may use different pre-coder matrixes with respect to different parts of a transmission bandwidth that results in a frequency selective pre-coding. Further, the UE may assume that the same pre-coding matrix is used through a group of PRBs called pre-coding RB group.

DL physical layer processing of a transmission channel is configured by following steps:
Transmission block cyclic redundancy check (CRC) attach;
Code block division and code block CRC attachment;
Channel coding: low-density parity-check (LDPC) coding;
Physical layer hybrid HARQ processing and rate matching;
Bit interleaving;
Modulation: quadrature phase shift keying (QPSK), 16 quadrature amplitude modulation (QAM), 64-QAM and 256-QAM;
Layer mapping and pre-coding;
Mapping to an assigned resource and an antenna port.

The UE may assume that at least one symbol having a DM-RS is included in each layer in which a PDSCH is transmitted to the UE. The number of DM-RS symbols and resource element mapping are configured by a higher layer. A TRS may be transmitted on an additional symbol in order to assist receiver phase track.

The PDCCH is used to schedule DL transmission on the PDSCH and UL transmission on the PUSCH. Downlink control information (DCI) on the PDCCH include following information.

DL assignment including at least modulation and coding scheme, resource assignment and HARQ information associated with DL shared channel (DL-SCH);

UL scheduling grant including at least modulation and coding scheme, resource assignment and HARQ information associated with UL shared channel (UL-SCH).

A control channel is formed by a group of control channel elements, and each control channel element consists of a set of resource element groups. Different numbers of control channel elements are collected so that different code rates with respect to the control channel are configured. Polar coding is used for the PDCCH. Each resource element group transporting the PDCCH transports a DM-RS thereof. QPSK modulation is used for the PDCCH.

Figure 3:
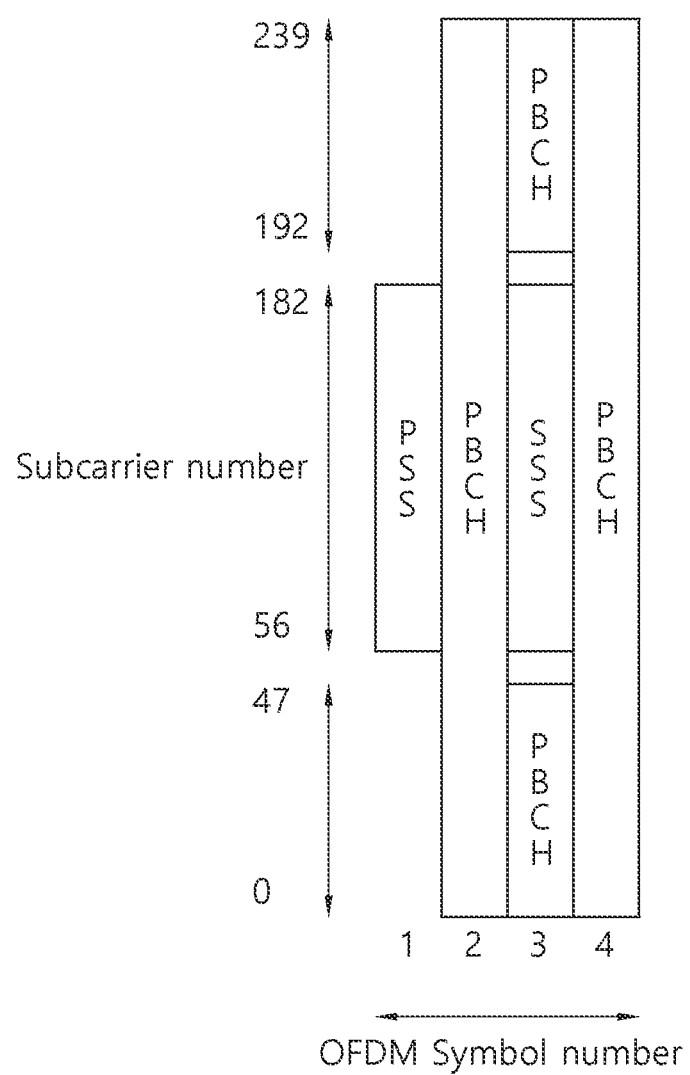
FIG. 3 illustrates a time-frequency structure of an SS block. A

FIG. 3 illustrates a time-frequency structure of an SS block. A synchronization signal and a physical broadcast channel (PBCH) block (hereinafter referred to as, 'SS block') consists of a primary synchronization signal (PSS) and a secondary synchronization signal (SSS), occupying 1 symbol and 127 subcarriers respectively, and a PBCH, which is configured by three symbols and 240 subcarriers but which leaves a unused part at a middle on one symbol for the SSS. A transmission period of the SS block may be determined by a network, and a time position to which the SS block is transmitted is determined by a subcarrier spacing.

Polar coding is used at the PBCH. Unless the network configures different subcarrier spacings to the UE, the UE may assume a band specific subcarrier spacing for the SS block. A PBCH symbol transports frequency multiplexed DM-RS thereof. QPSK modulation is used for the PBCH.

When supported by the network, a wideband may be used in NR. Further, in the NR, a bandwidth supported from the network may differ from a bandwidth supported from the UE. In this case, there is a need to clearly define how to performing transmission and/or reception between the network and the UE.

Figure 4:
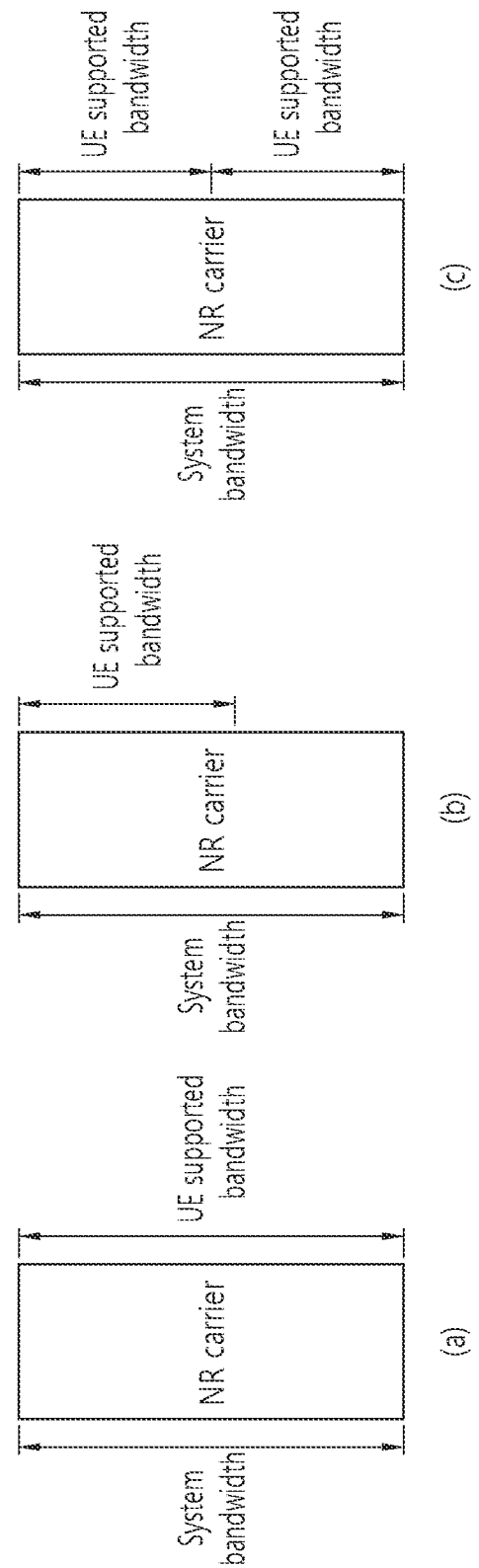
FIG. 4 illustrates an example of a system bandwidth and a bandwidth supported from the UE in an NR carrier.

FIG. 4 illustrates an example of a system bandwidth and a bandwidth supported from the UE in an NR carrier. It is assumed in FIG. 4 that a bandwidth supported from a network is a system bandwidth. However, according to a required system bandwidth, the network may combine an NR carrier. Further, the bandwidth supported from the UE may correspond to the BWP mentioned above. FIG. 4-(a) illustrates a case where the system bandwidth is the same as the bandwidth supported from the UE. FIG. 4-(b) illustrates a case where the system bandwidth differs from the bandwidth supported from the UE. In FIG. 4-(b), the bandwidth supported from the UE may be less than the system bandwidth or the bandwidth supported from the UE may be greater than the system bandwidth. FIG. 4-(c) illustrates a case where the UE support a wideband using a plurality of radio frequency (RF) elements. Accordingly, the system bandwidth may be the same as the bandwidth supported from the UE. A plurality of RF elements may share a baseband element. An individual baseband element may be assigned in a unit of each RF element. It is assumed in the present specification that a plurality of RF elements may share a baseband element/ability. The above may depend on UE ability.

Figure 5:
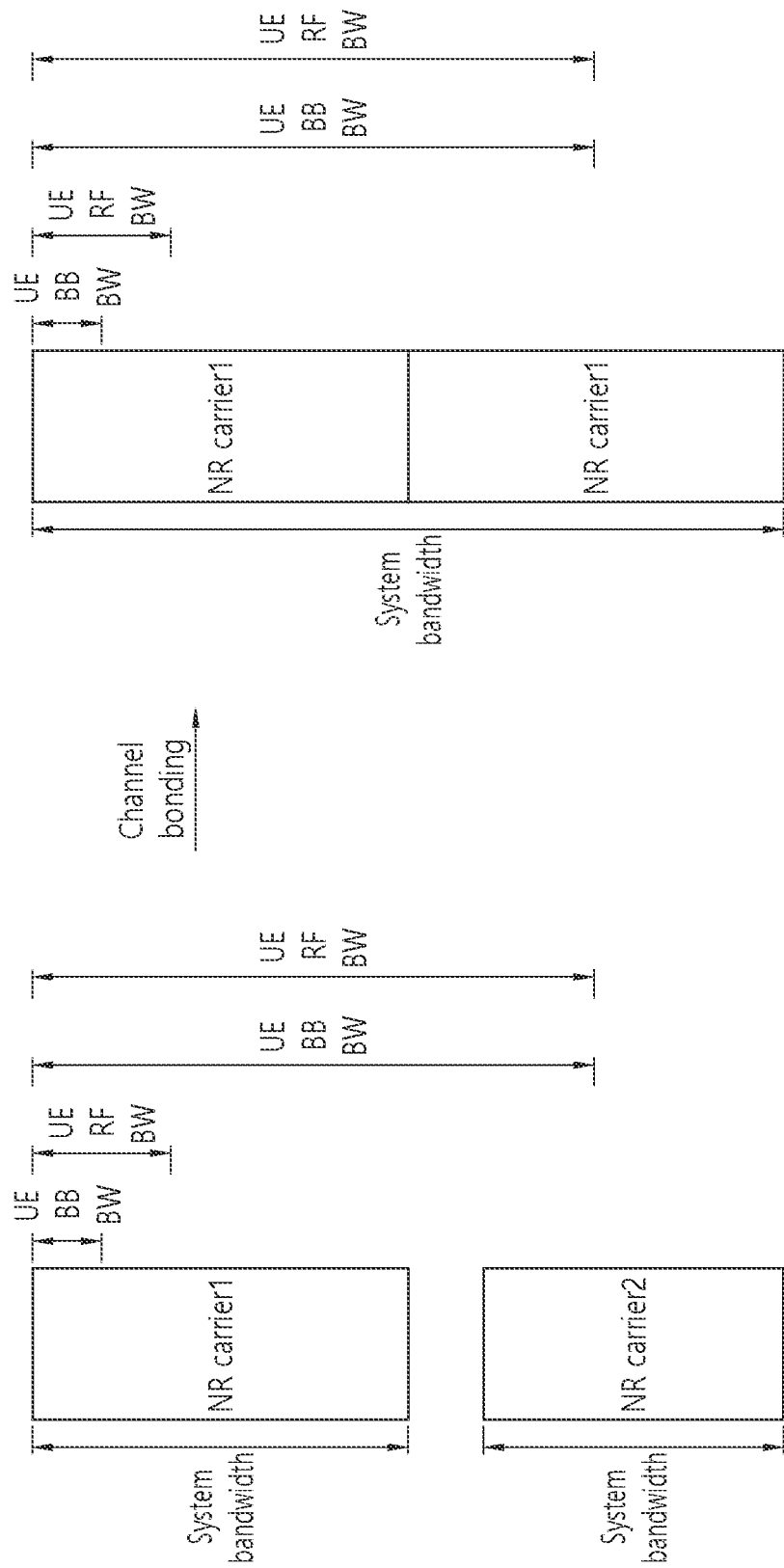
FIG. 5 illustrates an example of carrier aggregation.

FIG. 5 illustrates an example of carrier aggregation. If a plurality of NR carrier is aggregated to configure one carrier, the system bandwidth may be changed and a center frequency may be changed. However, a direct current (DC) subcarrier may be changed or may not be changed according to an operation of the network. When the DC subcarrier is changed, the DC subcarrier may be indicated to the UE to suitably process the DC subcarrier.

Hereinafter, various embodiment of the present invention are described as follows.

1. Sub-Band Configuration

According to a synchronization signal (SS) including a primary synchronization signal/secondary synchronization signal/physical broadcast channel (PBCH), a relationship between an anchor sub-band including an SS block and a sub-band may be changed. In order to dispose the anchor sub-band, followings option may be considered. The sub-band may correspond to the BWP mentioned above. The anchor sub-band may be called another name such as an initial BWP.

(1) Option 1: The anchor sub-band may be located at only one of determined sub-bands. The size of the sub-band may be determined based on the system bandwidth. The anchor sub-band may be located at only one of the sub-bands. For example, if it is assumed that the system bandwidth is 400 MHz and a size of the sub-band is 100 MHz, the anchor sub-band may be located at one of 4 sub-bands. The SS block may be located at any position in the anchor sub-band. Meanwhile, if there are different bandwidths supported by the network in the same frequency band, it may be preferred that different bandwidths are arranged. For example, when one cell is operated at a bandwidth of 4*100 MHz and another cell is operated at a bandwidth of 400 MHz, a sub-band of 100 MHz may help to arrange different bandwidths between cells at the same frequency band. However, according to the above arrangement, a position of the SS block may be limited.

The sub-band configuration may be defined per frequency range or per frequency band. For example, when a current LTE frequency band is used an NR frequency band as it is or is shared with an NR frequency band, the number of sub-bands may be 1 and a sub-band size may be the same as a system bandwidth. That is, the sub-band may not be supported from a frequency band equal to or overlapping with an LTE frequency band. Meanwhile, when the NR frequency band is redefined through at least one LTE frequency band, partial UEs may not support the system bandwidth. Accordingly, at the frequency band equal to or overlapping with the LTE frequency band, a sub-band size (e.g. 20 MHz or 10 MHz) fixed according to UE minimum bandwidth requirements or a general UE RF bandwidth may be configured.

In this case, a position of the SS block may be limited according to the sub-band size. That is, a partial synchronization raster may not be used for mapping of a synchronization signal. It is because the SS block is configured through a sub-band (that is, the SS block is not fully included in one sub-band). Since there is no mapping of the synchronization signal in a corresponding synchronization raster, the UE does not need to discover a corresponding synchronization raster.

(2) Option 2: An anchor sub-band may be configured based on initial synchronization. Based on the SS block, it may be assumed that a center of the SS block is a center of the anchor sub-band. The anchor sub-band may be implicitly configured. The size of the anchor sub-band may be previously determined or may be defined by a master information block (MIB) in the SS block. In this case, when frequencies on which the SS block is transmitted differ from each other between neighbor cells, the sub-band may not be arranged between the neighbor cells. Further, the subcarrier and a RB grid may not be arranged.

(3) Option 3: An anchor sub-band may be configured separately from another sub-band. That is, a sub-band configuration may be configured based on a system bandwidth or may be pre-configured per frequency range or per frequency band. An anchor sub-band to which the SS block is transmitted may not be associated to a sub-band configuration. Accordingly, the SS block may be transmitted in any place, and the anchor sub-band may be configured to partially or fully overlap with another sub-band.

Figure 6:
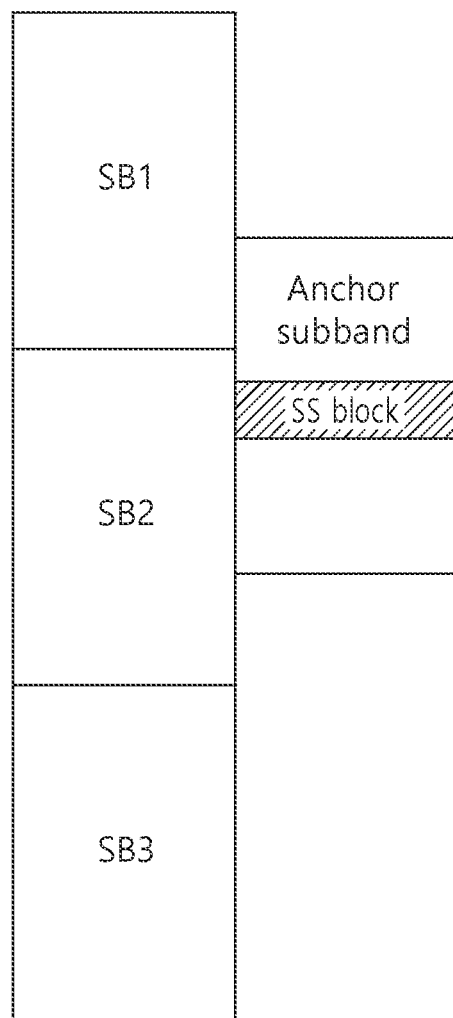
FIG. 6 illustrates an example of an anchor sub-band configured separately from another sub-band according to an embodiment of the present invention.

FIG. 6 illustrates an example of an anchor sub-band configured separately from another sub-band according to an embodiment of the present invention. Referring to FIG. 6, the UE is configured to support 3 sub-bands. However, the anchor sub-band is configured separately from the three sub-bands which are configured. In FIG. 6, an anchor sub-band is configured through a sub-band 1 and a sub-band 2, and an SS block is transmitted through an anchor sub-band.

If a sub-band is configured/defined, a group of sub-bands may be indicated to the UE through group common signaling.

2. Configuration of Common Search Space (CSS)

A plurality of analog beams may be configured to transmit one SS block. After detecting the SS block, it is assumed that the UE uses an optimal combination of beams detected from an SS block to transmit a control channel. The best combination of beams detected from the SS block may be called wide beam. Since there may be a plurality of beams in a wide beam, the same information may be transmitted through different beam. For example, if the UE knows the number of beams in the SS block and detects an optimal beam from a plurality of beams in the wide beam, the UE may monitor only the optimal beam to minimize power consumption for monitoring a control channel. If the network acquires information on an optimal beam, the network may configure a CSS and/or a UE-specific search space (USS) and/or a group common SS based on the corresponding information. That is, the network may define a CSI-RS resource in a QCL relationship for a control channel based on the corresponding information. That is, before a CSI-RS configuration, an SS block for control channel monitoring may be implicitly configured to the UE. After the CSI-RS configuration, a QCL CSI-RS resource for control channel monitoring may be indicated to the UE.

3. Initial Access Procedure and Configuration

The present invention describes a method for receiving an SS block including PSS/SSS/PBCH, regarding an initial access procedure and configuration in NR.

Figure 7:
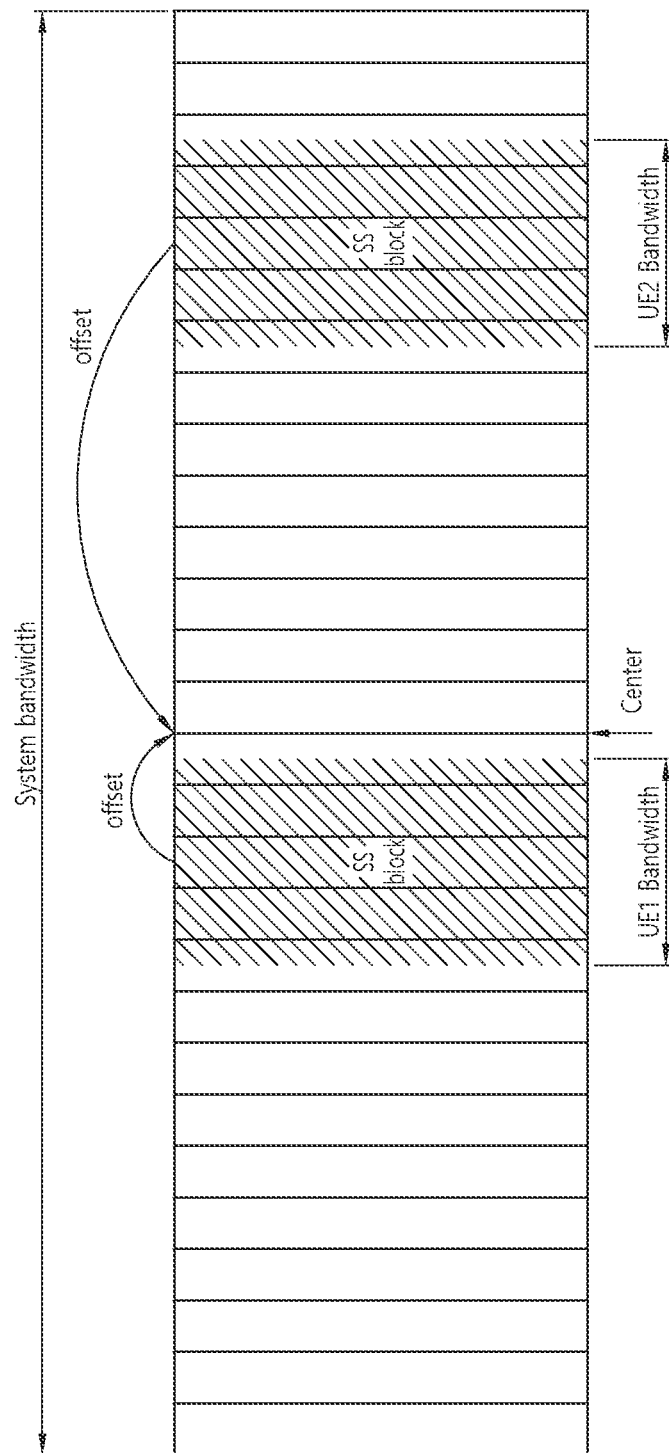
FIG. 7 illustrates an example of receiving an SS block by different UEs according to an embodiment of the present invention.

FIG. 7 illustrates an example of receiving an SS block by different UEs according to an embodiment of the present invention. An initial BWP (or anchor sub-band) including an SS block may be changed based on a UE procedure. Referring to FIG. 7, a BWP1 including an SS block read by UE1 differs from a BWP including an SS block read by UE2, and both of the BWP1 and the BWP is smaller than a system bandwidth. A center of the two BWPs is spaced apart from a center of the system bandwidth by another offset.

When a control resource set (CORESET) for minimum system information (SI) or remaining minimum SI (RMSI) does not cover the SS block, a default BWP may be configure to include an SS block according to UE ability. That is, if a UE minimum bandwidth is greater than a sum of an RMSI bandwidth and an SS block bandwidth, a RMSI CORESET and the SS block are continuously multiplexed by frequency division multiplexing (FDM), an initial BWP may cover both of the RMSI CORESET and the SS block. Otherwise, the initial BWP may cover the RMSI CORESET. After the network knows the bandwidth supported from the UE, the network may reconfigure a default BWP capable of including an SS block and a necessary RMSI CORESET bandwidth in the UE. If the UE reads the SS block, it may be assumed that the SS block bandwidth is a UE bandwidth.

A PBCH included in the SS block may include at least one of following information. However, following information may be transmitted through RMSI or UE specific signaling as well as a PBCH. In particular, with respect to a secondary cell (SCell), there is a need for UE specific signaling to transmit following information.

(1) Carrier Bandwidth:

Option 1: An MIB transmitted through a PBCH may include information on a carrier bandwidth. The information on a carrier bandwidth may have a size of 3 bits. The information on a carrier bandwidth may include information on a group of carrier bandwidths. For example, 5, 20, 40, 80, 100 MHz may be indicated in a bandwidth of below 6 GHz, and 100, 200, 400 MHz may be indicated at a bandwidth of above 6 GHz. A real bandwidth supported from the network may be also indicated. The information on a carrier bandwidth may include information on a potential maximum bandwidth in which a carrier is operated. That is, since the indicated carrier bandwidth is the potential maximum bandwidth, the UE does not need to assume the system bandwidth. Further, for future forward compatibility, several states and/or reserved fields may be used. The reserved field may indicate an additional maximum system bandwidth. A future UE may assume a sum of a first carrier bandwidth and an additional maximum system bandwidth indicated by the reserved field as a maximum system bandwidth.

Option 2: An MIB transmitted through a PBCH may not include information on a carrier bandwidth. However, the carrier bandwidth may be indicated by SI such as RMSI. For future forward compatibility, at least one field may be used to imply system information. In order to support disposal or change of a flexible network, no information on the system bandwidth may be indicated. When information on the system bandwidth is not indicated, a PRB indexing may be performed based on 1 GHz or a maximum bandwidth such as 400 PRB. For a future UE/network supporting 400 PRB or greater, PRB indexing may be performed while being divided into two groups of 0-399 and 400-X. A common data/control signal may be scheduled in a PRB having an index of 0~399, which is shared with a UE supporting a previous release. Another data/control signal may be scheduled at all PRBs. PRB indexing may be performed from a virtually lowest frequency. With respect to a greater subcarrier spacing, the maximum number of PRBs may be changed. For example, when a maximum system bandwidth is 400 MHz, the maximum number of PRBs based on a subcarrier spacing of 120 kHz is 278, and the maximum number of PRBs based on a subcarrier spacing of 240 kHz is 139.

(2) Offset Between a Center of an SS Block and a Center of a System Bandwidth

An MIB transmitted through a PBCH may include information on an offset between a center of an SS block and a center of a system bandwidth. Since the center of an SS block differs from the center of a system bandwidth, the above information may be indicated by the UE. The above information may be included in a PBCH regardless of whether information on the carrier bandwidth is included in the PBCH. When the information on the carrier bandwidth is included in the PBCH or an RMSI bandwidth is the same as a PBCH bandwidth, the PBCH may include information on an offset between the center of the SS block and the center of the system bandwidth. Meanwhile, when the system bandwidth is indicated by the RMSI or the RMSI is not located at the same bandwidth/frequency as that of the PBCH, the PBCH may include information on an offset between a center of a PBCH or a RMSI and a center of a system bandwidth instead of the information on offset between the center of the SS block and the center of the system bandwidth. Further, for PRB indexing, an MIB transmitted through the PBCH may also include information on an offset between a PRB of the lowest index of the SS block and a virtual PRB 0. In detail, the MIB transmitted through the PBCH may include a subcarrier (subcarrier 0) of the lowest index of the SS block and a subcarrier (subcarrier 0) of the lowest index of a common RB.

Information on an offset between the center of the SS block and the center of the system bandwidth may be expressed as a value with respect to a channel raster (or synchronization raster). If it is assumed that a channel raster is 100 kHz, following options may be considered.

Option 1: The option 1 uses a channel raster of {6, 8, 9, 10, 10} bit with respect to {5, 20, 40, 80, 100} MHz bandwidth in a frequency band below 6 GHz.

Option 2: The option 2 uses a synchronization raster using a channel raster and an offset.

Option 3: The option 3 uses a RB bandwidth using the number of subcarriers and an offset. When a gap between 2 SS blocks is the same as multiple RBs bandwidth based on a numerology of PSS/SSS/PBCH, offset related information may be omitted.

If it is assumed that a channel raster is 240 kHz, or a plurality of subcarriers or at least one RB based on a numerology used for RMSI (or PSS/SSS/PBCH), following options may be considered.

Option 1: The option 1 uses a channel raster of {9, 10, 11} bit with respect to {100, 200, 400} MHz bandwidth.

Option 2: The option 2 uses a synchronization raster (e.g. 1440 kHz) of {7, 8, 9} bit with respect to {100, 200, 400} MHz bandwidth Option 3: The option 3 uses a RB bandwidth using the number of subcarriers and an offset. When a gap between 2 SS blocks is the same as multiple RBs bandwidth based on a numerology of PSS/SSS/PBCH, offset related information may be omitted.

Information on an offset between a center of an SS block and a center of the system bandwidth may be expressed as a positive value or a negative value according to whether the center of the system bandwidth is higher or lower than the center of the SS block.

Meanwhile, the information on the carrier bandwidth is included in the PBCH, the information on an offset between a center of an SS block and a center of the system bandwidth may be a maximum bit assuming a maximum bandwidth supported by a carrier.

As described above, the information on an offset between a center of an SS block and/or a RMSI and a center of the system bandwidth, and/or information on an offset between a PRB (or subcarrier) of the lowest index of the SS block and/or the RMSI and a PRB 0 (or subcarrier 0) of the system bandwidth may be indicated to the UE. Accordingly, the UE may perform common PRB indexing through the system bandwidth as well as PRB indexing in a BWP configured to the UE (i.e. local PRB indexing).

A concept of the above local/common PRB indexing is applicable to scrambling of a control signal/data/reference signal (RS) in a BWP of the UE and/or RS generation and/or common data scheduling in an initial CSS. That is, if the UE knows the system bandwidth according to information on the system bandwidth and/or information on an offset between a center of the SS block and a center of the system bandwidth, scrambling of a control signal/data/RS in a BWP of the UE and/or RS generation and/or common data scheduling in an initial CSS may be performed based on the system bandwidth and a common PRB indexing. This means that a sequence for scrambling of a control signal/data/RS and/or RS generation and/or common data scheduling in an initial CSS is generated across whole PRBs in the system bandwidth. If the UE does not know a system bandwidth, scrambling of the control signal/data/RS in a BWP of the UE and/or RS generation and/or common data scheduling in initial CSS may be performed based on a configured bandwidth (i.e. initial BWP) and local PRB indexing. This means that a sequence for scrambling of the control signal/data/RS and/or RS generation and/or common data scheduling in the initial CSS is generated across PRBs in the BWP.

If information on an offset for a common PRB indexing is provided from an RMSI instead of RMSI CORESET, common PRB indexing may be used for scrambling of the control signal/data/RS and/or RS generation and/or common data scheduling. When a RMSI CORESET is shared for another radio network temporary identifier (RNTI) monitoring, local scrambling/PRB indexing may be used for RMSI control signal/data monitoring and common scrambling/PRB indexing may be used for monitoring another channel (non-RMSI control signal/data).

In order to minimize burden of channel estimation, if a CORESET is configured together with a wideband and a RMSI CORESET is shared with another transmission, local scrambling/PRB indexing may be always used. That is, RS sequence related parameters (e.g. length, an offset and the like) may be configured per CORESET. Such a method may be applicable to only a case of configuring a wideband. That is, if the wideband is configured, RS sequence related parameters (e.g. length, offset and the like) may be explicitly or implicitly configured per CORESET. For example, when a wideband is used as a default, local scrambling/PRB indexing may be used with respect to RMSI CORESET. A similar scheme may be applicable to generation of an RS sequence. With respect to data, different RS sequences may be generated/used according to whether the UE knows a common PRB indexing. For example, a RMSI PDSCH may use an RS sequence based on local PRB indexing. Another PDSCH may use an RS sequence based on common PRB indexing.

Or, local scrambling/PRB indexing may be used for transmission of all common control signals. In order to transmit common data, one of local scrambling/PRB indexing and common scrambling/PRB indexing may be used. Common scrambling/PRB indexing may be used to transmit non-common control signal/data such as group common or UE specific signaling. Scrambling and/or DM-RS sequence related parameter/configuration may be performed per BWP, and the initial DL/UL BWP may assume local scrambling/PRB indexing. Scrambling of the control signal/data/RS and/or RS generation and/or common data scheduling at initial CSS may be performed based on a maximum system bandwidth. This is for the purpose of future forward compatibility, and the maximum system bandwidth may be defined as K times of an actual maximum system defined per frequency band or per frequency range. Resource allocation for data scheduling may be performed based on a configured bandwidth (i.e. initial BWP). That is, regardless of common PRB indexing based on a system bandwidth or a potential maximum system bandwidth, resource allocation for data scheduling may be performed based on local PRB indexing.

Figure 8:
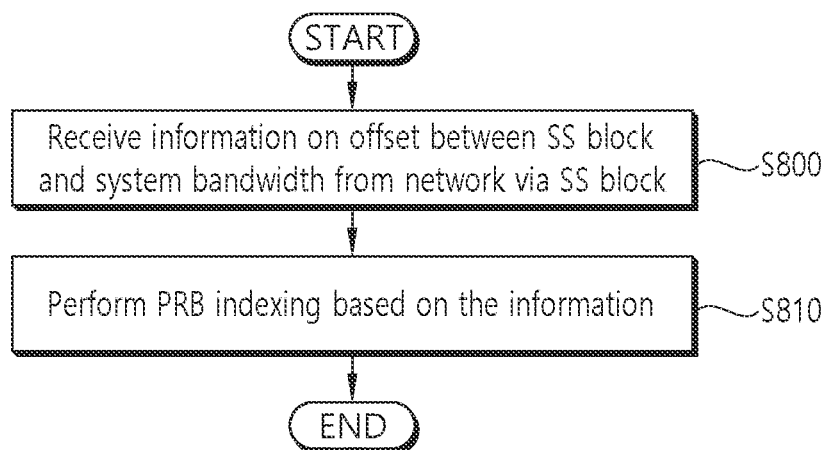
FIG. 8 illustrates a method for performing PRB indexing by UE according to an embodiment of the present invention.

FIG. 8 illustrates a method for performing PRB indexing by UE according to an embodiment of the present invention. The present invention described above may be applicable to this embodiment.

At step S800, a UE receives information on an offset between an SS block and a system bandwidth from a network through an SS block. The information on the offset may include information on an offset between a PRB of the lowest index of the SS block and a PRB of the lowest index of the system bandwidth. In detail, the information on the offset may include information on an offset between a subcarrier 0 of the SS block and a subcarrier 0 of the system bandwidth. The information on the offset may include information on an offset between a center of the SS block and a center of the system bandwidth. The SS block may further include information on the system bandwidth. The information on the system information may include information on a potential maximum bandwidth in which a carrier is operated. The SS block may be included in an initial UL BWP. The information on the offset may be expressed as a value of a channel raster or a synchronization raster.

At step S810, the UE may perform the PRB indexing for the system bandwidth based on information on the offset. That is, the UE may perform common PRB indexing. Scrambling of a control signal, data, and a reference signal may be performed based on the PRB indexing for the system bandwidth. Further, the reference signal may be generated based on the PRB indexing for the system bandwidth.

Figure 9:
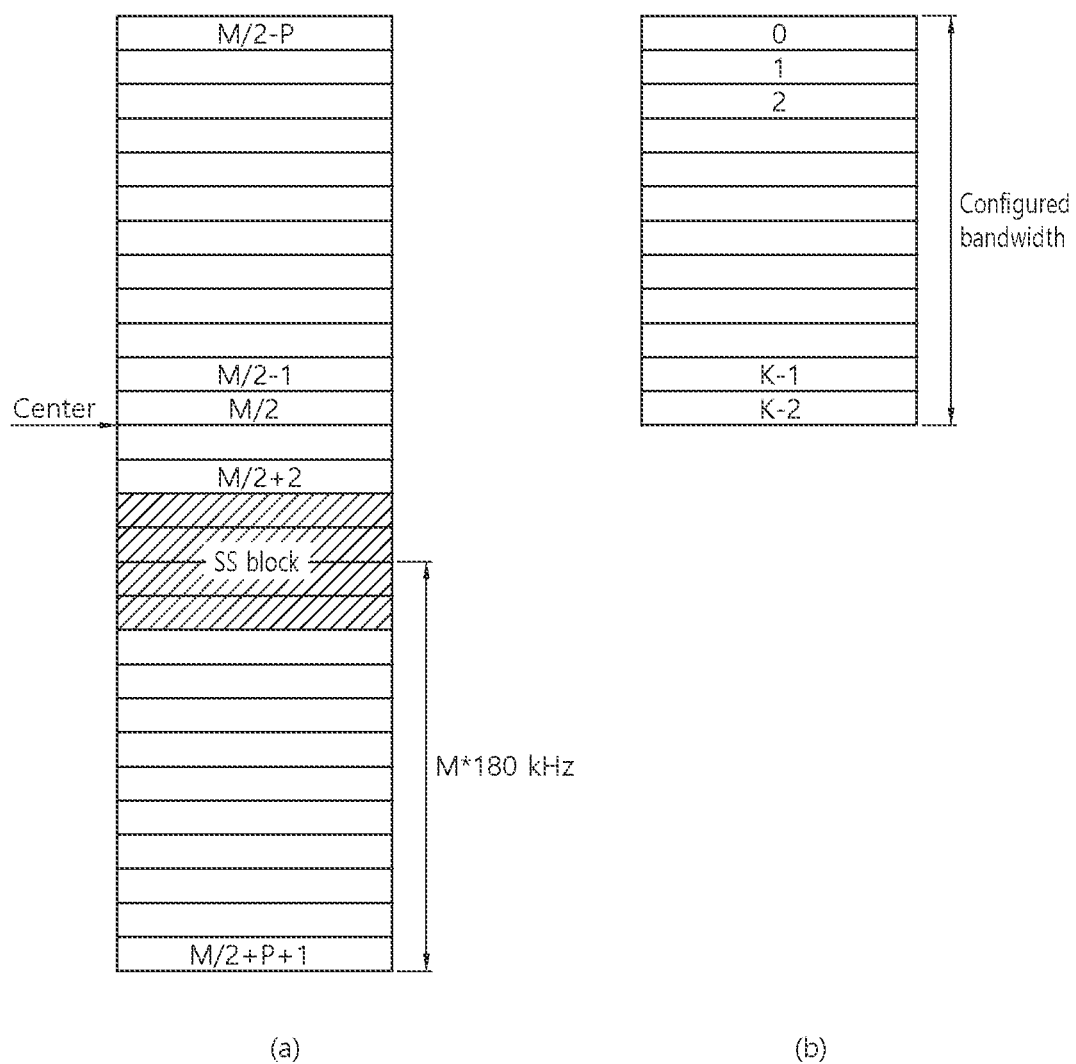
FIG. 9 illustrates an example of reception of an SS block according to an embodiment of the present invention.

FIG. 9 illustrates an example of reception of an SS block according to an embodiment of the present invention. FIG. 9-(a) illustrates a system bandwidth, and a common PRB indexing for PRBs included in the system bandwidth is defined. The center of the system bandwidth does not correspond to the center of the SS block. Accordingly, information on an offset between the center of the SS block and the center of the system bandwidth or information on an offset between a PRB of the lowest index of the SS block and a PRB 0 of the system bandwidth may be indicated to the UE. It is assumed in FIG. 9-(a) that a center of the SS block is arranged at a synchronization raster of 15 kHz. FIG. 9-(b) illustrates a bandwidth configured to the UE, i.e. BWP, and a local PRB indexing for the PRB included in a BWP is defined. Regardless of common PRB indexing, resource allocation for data scheduling may be performed based on local PRB indexing.

PRB indexing/scrambling according to each control signal/data may be as follows.

(1) Cell common or UE group common control signal/data

PRB indexing/scrambling in BWP configured for data transmission

PRB indexing/scrambling in a BWP configured for CORESET for control signal, and in a BWP configured for data transmission for data PRB indexing/scrambling in a system bandwidth or a maximum bandwidth (e.g. virtual PRB based on common PRB indexing)

PRB indexing/scrambling in a configured BWP which is or is not the same as a data bandwidth (e.g. bandwidth for sub-band)

PRB indexing/scrambling based on a system bandwidth or a BWP (e.g. a carrier bandwidth or a maximum bandwidth) for a control signal/data (2) UE specific control signal/data PRB indexing/scrambling in at least a BWP configured for UE specific data and USS including a dedicated reference signal PRB indexing/scrambling based on a system bandwidth or BWP (e.g. carrier bandwidth or maximum bandwidth) with respect to a control signal including a shared reference signal, and PRB indexing/scrambling based on configured BWP for a remainder (3) Dedicated reference signal: PRB indexing/scrambling may be performed based on a BWP or an allocated PRB. In case of non-continuous resource allocation, scrambling or sequence generation may be performed based on a bandwidth between a first PRB and a final PRB of resource allocation. Scrambling or sequence generation may be performed based on a BWP or a common PRB indexing in a maximum system bandwidth.

(4) Shared reference signal: PRB indexing/scrambling may be performed based on a system bandwidth or CORESET using a shared reference signal or BWP. Scrambling or sequence generation may be performed based on BWP or common PRB indexing in a maximum system bandwidth.

(5) Remaining reference signal: PRB indexing/scrambling may be performed based on a system bandwidth or CORESET using a shared reference signal or BWP. Scrambling or sequence generation may be performed based on BWP or common PRB indexing in a maximum system bandwidth.

For the purpose of future flexibility and potential extendibility, it may be considered that a sequence of a control signal/data/reference signal starts from a center frequency to be indexed to a maximum bandwidth or a maximum PRB index. The maximum PRB index may be previously determined, or may be indicated by PBCH/SIB. When considering the maximum PRB index, an PRB index close to a center frequency may be close to max_PRB/2. Otherwise, it may be difficult when a UE having different bandwidths shares the same resource for a control signal/data/reference signal. A common scrambling/PRB indexing may be used for at least shared control signal/data/reference signal, and a local scrambling/PRB indexing may be used for UE specific shared control signal/data/reference signal.

4. Relationship Between Carrier Aggregation (CA) and BWP

For the CA and a BWP configuration, two options may be considered.

(1) A carrier may be defined as a default BWP, and a UE may be configured with a default BWP with respect to each carrier. Further, a plurality of BWPs may be configured based on a default BWP. A default BWP may be defined as a default BWP of a carrier based on the SS block. For example, if an SS block or a different time/frequency synchronization (coarse synchronization) is acquired by an SS block of a different carrier, a default BWP of one carrier may be defined as a BWP including an SS block of the different carrier. That is, a BWP of a different frequency band or a different carrier including a synchronization reference such as an SS block may be used as a default BWP of a carrier. Or, the default BWP may be defined as a group of PRBs. The default BWP may include an SS block or may not include the SS block. When the default BWP does not include the SS block, the default BWP should include a time synchronization reference. Potentially, the default BWP may include a CSI-RS or beam management RS or a different tracking RS. After acquiring coarse time/frequency synchronization, the UE may acquire additional track through a configured RS such as beam management RS/track RS. Alternatively, a default inactivated SCell may be configured, and a configuration of the SCell may include a configuration of a default inactivated BWP upon configuration.

The default BWP may be configured regardless of a position of the SS block. However, this may limit a partial measurement related characteristic similar to the primary cell (PCell). Further, a frequency position of DL and UL (or one of two in a case of an unpaired spectrum) may be included in a configuration of a carrier.

For activation of a default BWP, following options may be considered.

The default BWP may be activated when a carrier is configured. The default BWP may be used to measure a radio resource management (RRM) and basic beam management. Accordingly, the default BWP may be activated when a carrier is configured. The default BWP may be associated with a CORESET in a different carrier or with at least one configured CORESET in a configured default BWP.

When the default BWP is configured for the SCell, the UE may not assume that one is automatically activated when at least one BWP is additionally configured. That is, the UE may be implicitly indicated with respect to activation of at least one of the configured BWPs.

When the default BWP is configured by at least one CORESET, a period of a monitoring section for each CORESET may be differently configured. In more general, a period of a different monitoring section for a given CORESET may be indicated by downlink control information (DCI) or a media access control (MAC) control element (CE). Accordingly, before a certain active BWP may be used, or after a BWP is activated and before a carrier is activated, or between a discontinuous reception (DRX) inactive timer and active timer, a period of a different monitoring section may be supported for the default BWP. If a period of a monitoring section is changed, a corresponding instruction may be transmitted through the same DCI without a BWP change. That is, a period of a monitoring section of a BWP configured with respect to a given BWP in activation of the BWP may be also indicated. Alternatively, in order to allow a period of a different monitoring section, a separate DCI may be used. A DCI or an MAC CE for changing a beam direction may be used to reconfigure or change a CORESET related parameter. That is, a DCI for dynamically changing a group of parameters for CORESET including the beam direction, a period of a monitoring section, and scrambling.

(2) A carrier may be defined as an offset to a center frequency position, or a reference frequency position, and a PRB of the lowest index therefrom, and may be configured in UE through SCell configuration. Further, a reference numerology used in the SCell may be configured, and a corresponding reference numerology may be used for an offset. Further, a reference to an SS block for synchronization or an SS block of a different carrier may be configured. Upon configuring, the UE assumes that the carrier is inactivated. Further, the UE may be configured with a plurality of BWPs, and a switching mechanism of a single carrier or a PCell may be used among the plurality of BWPs. When at least one BWP in a carrier is activated, it is assumed that SCell activation is performed. The difference from the SCell is in that there may not be BWP activated at a certain time point, and at least one BWP may be activated. With regard thereto, since the UE does not monitor the CORESET at an inactive SCell, there is a need for cross-carrier scheduling to activate at least a first BWP. Accordingly, until an activated BWP may be used in a carrier, there is a need for the cross-carrier scheduling. Next, the UE may depend on the same cross-carrier scheduling. In this case, the reference frequency position may include a frequency position of an SS block when a corresponding carrier includes the SS block or a virtual or center frequency position to which the UE will attempt retuning for measurement.

Additionally, the UE may be configured with following information.

Cell ID: A cell ID may be acquired by an SS block. A reference SS block may use a cell ID different from that used for SCell. That is, the cell ID may be provided to the UE. In order to obtain coarse time/frequency synchronization, a position of the SS block may be used, and a different cell ID may be used in the SS block. For example, a SS block in a different carrier may become a reference. However, a SS block of a different carrier is in perspective of the UE. In perspective of network, the cell ID may be shown as a SS block in the same carrier.

An offset between a reference point and PRB 0: a PRB 0 may not be an actual PRB 0 of a carrier. The PRB 0 may be selected so that all numerologies supported by the carrier may be arranged a center of a carrier. That is, the offset may be a multiple of K in an aspect of the PRB, and K=SC_max/SC_0. The SC_max is a maximum subcarrier spacing supported from the carrier, and the SC_0 is a numerology of an SS block. A PRB grid may be configured from PRB 0, which may not be arranged at a center of the SS block.

A numerology used in the SCell: Unless indicated otherwise, a corresponding numerology may be used for a control signal and data. The SCell may support a plurality of numerologies. In this case, a default numerology may be configured by a SCell configuration, and another numerology may be additionally configured through RRC signaling.

Based on the information, a cell may be defined by a combination of a cell ID, a reference point, a reference of the SS block (or difference from the reference point), and a potential maximum bandwidth.

In summary, there are following 3 options for CA and BWP configuration.

(1) As a first option, a SCell may be configured and the SCell may maintain an inactive state. In an inactive state, the SCell may not have an active BWP before active BWP is explicitly indicated or the SCell is explicitly activated. Accordingly, the UE does not need to monitor the CORESET in the SCell.

(2) As a second option, if the default BWP includes a CORESET configuration in the same carrier, the SCell may be configured with a default BWP to be activated. That is, for a cell other than the PCell, a CORESET capable of transmitting an active DCI may be configured per each default BWP configuration. If the CORESET is included in the same BWP, the UE may consider that the default BWP is activated when configured. Next, the UE may be switched to another BWP. If the CORESET is included in another carrier, the SCell maintains an inactive state. A cross carrier or a cross BWP scheduling may be used to activate a BWP in a SCell of a corresponding different carrier.

(3) As a third option, a CORESET associated with a default BWP should be present. Accordingly, a default state of the default BWP may be an active state. That is, when the SCell is activated, there may be at least one BWP which is automatically activated, and a corresponding BWP may include an associated CORESET configuration in a SCell configuration. A corresponding CORESET may be cross-carrier-scheduled by the PCell or another SCell.

When the BWP is not configured by the CORESET, whenever the UE needs to retune the default BWP, a configuration/reference CORESET of the default BWP may be used for control channel monitoring.

That is, a CORESET configuration for the default BWP may follow one of following options.

Explicit CORESET configuration in a default BWP
CORESET is configured based a previously configured CORESET in another carrier or another BWP
No assumption with respect to COREST is configured. A PCell CSS or USS may be regarded as a CORESET capable of using a carrier or a BWP in the SCell.

A configuration of the BWP may include an associated SS block (may be assumed as an SS block for initial access when it is not given) or a default BWP. The configuration of the BWP may include CORESET information capable of being monitored by self BWP scheduling or cross BWP scheduling with a given BWP.

In a SCell configuration, the UE may be configured with at least one BWP, and at least one BWP may be indicated by a default BWP which is automatically activated upon activation. Further, the UE may be configured with a combination of a cell ID of the SCell, a reference point, and a SCell index (if possible, for example, upon cell activation). Moreover, the UE may be configured with a separate CORESET per each BWP or by a CORESET with respect to at least default BWP. In addition, the UE may be separately configured with respect to a measurement target for SCell.

In a primary SCell (PSCell), the same configuration as the SCell configuration may be given in a BWP aspect. For activation, instead of configuring the default BWP, an initial BWP for initial access may be used as a default BWP. When assistance information from the PCell is considered, a default BWP may be also indicated. The UE may assume that the initial access is performed in a default BWP. That is, the default BWP may be indicated for the PSCell, and assistance information for initial access may be located in the default BWP. The default BWP needs to include associated CORESET in the same carrier.

For the purpose of activation of the SCell, following options may be considered.

(1) An MAC CE for activating at least one SCell may be used, and the default BWP may be automatically activated.

(2) MAC CE activation for activation of at least one BWP may be simultaneously generated per SCell with respect to configured SCells. If at least one BWP is activated, the UE may assume that the SCell is activated. If it is considered that a specific SCell does not perform physical random access channel (PRACH) transmission, the SCell may be activated only when at least one DL BWP is activated. With respect to a carrier allowing PRACH transmission, there is a need to activate at least one UL BWP before the at least one UL BWP is regarded as an active carrier.

(3) In order to activate at least one BWP in a configured PCell/SCell, a scheduling DCI may be used. In order to activate each BWP, a separate scheduling DCI may be used. In order to allow activation between BWPs regardless of a carrier including the BWP, cross carrier or cross BWP scheduling may be configured. That is, for example, if a carrier x includes BWP1 and BWP2, the BWP1 may be activated by BWP3 in a carrier y, and the BWP2 may be activated by a BWP4 in a carrier z. If there is a plurality of BWPs, at least one BWP may be cross carrier or cross BWP scheduled, and remaining BWPs may be self BWP scheduled. That is, separate cross carrier or cross BWP schedule may be supported.

(4) A separate DCI instead of a MAC CE may be used in the option (2).

5. Default BWP

A BWP accessed during an initial access procedure (reception of SS block, reception of RMSI, reception of random access response (RAR), and the like) may be regarded as a default BWP. A RMSI bandwidth may be regarded as a DL default BWP. A RACH bandwidth may be regarded as UL default bandwidth. The UL default bandwidth may be the same as the DL default bandwidth (addition to TX-RX or duplex gap). If a frequency in which RAR or MSG4 is received is reconfigured, a default BWP may be automatically changed according to the reconfiguration. That is, according to configuration of RACH procedure related message/CORESET, a default BWP during the initial access procedure may be switched.

For the purpose of load balance, it may be considered that the default BWP is switched from the initial BWP after connection. In order to support paging of an UE in an idle state, the UE may need to fall back to the initial BWP in which the SS block is firstly acquired. A BWP having an SS block for time/frequency synchronization and SS block based measurement may be configured as a fallback BWP. That is, if the UE is switched to an idle state, the default BWP may become an initial BWP or a separate fallback BWP for the purpose of fallback may be configured. The BWP may be differently configured per UE for load balance of paging. Each BWP may include an SS block which may differ from an initially accessed SS block. If the UE is directly configured with another BWP including an SS block which capable of using another cell ID from that of initially accessed SS block, the UE may maintain that two SS blocks become QCL. That is, if the UE is reconfigured with a BWP different from an initially accessed BWP during RRC connection configuration or idle state, the UE may assume that an initially accessed SS block and the reconfigured SS block have a QCL relationship. The QCL relationship may be explicitly indicated. The UE may reacquire or perform an initial access procedure. If a new SS block and the initially accessed SS block do not have the QCL relationship, the UE may perform handover.

An initial BWP may be configured to be activated simultaneously with SCell activation. If it is assumed that measurement is performed before activation, an initial BWP may not be associated with an SS block in a SCell.

In summary, there is an initial BWP accessed in RRC connection configuration or idle state, and the initial BWP may include an SS block at a PCell. The SCell may not include the initial BWP. A PSCell needs to include the initial BWP. The initial BWP may be regarded as a default BWP before reconfiguration. The default BWP may be reconfigured. The reconfigured default BWP may not include an SS block. If the reconfigured default BWP includes the SS block, the UE may take into consideration the followings.

If the new SS block has a QCL relationship with the initial SS block, the UE may switch to the new SS block. This may be performed by an explicit configuration of QCL relation. If it is indicated that the UE is reconfigured by a default BWP and a new default BWP includes an SS block, the UE may assume that a new BWP has the QCL relationship with the initial BWP.

If the new BWP does not have the QCL relationship with the initial BWP, the UE may be indicated that the two BWPs do not have the QCL relationship and may perform rate matching with respect to only the new SS block.

If a new BWP does not include the SS block, the UE may automatically assume that the new BWP has a QCL relationship with an initial BWP or a previous BWP.

6. BWP and SUL Carrier

In an NR, a DL carrier may be associated with a UL carrier having a band different from that of the DL carrier. Such a characteristic may be considered according to a following cause.

The number of UL carriers is smaller than the number of DL carriers. Accordingly, at least one DL carrier may be associated with the same UL carrier.

There may be a SUL carrier associated with a paired DL/UL spectrum or a non-paired DL/UL spectrum. The DL carrier may be associated with only one UL carrier (i.e. a UL carrier or a SUL carrier at the same band) or both of 2 UL carriers (like a UL CA). In this case, there is a demand to clearly define BWP configuration/activation.

(1) When at Least One DL Carrier is Associated with One UL Carrier

When the UL carrier corresponds to a UL spectrum in a paired DL/UL spectrum, activation/inactivation of the UL carrier may be independently performed. Otherwise, the UL carrier may be changed automatically or simultaneously with a DL carrier in the same frequency band. That is, a DL carrier in the same frequency band becomes a main carrier. Accordingly, a UL BWP may be changed. A switch command of the UL BWP may be transferred to only the main DL carrier. That is, another DL carrier may depend on the switch command in the main DL carrier. However, the above causes the UE to fail the switch command of the UL BWP, and particularly ambiguity may occur when another DL carrier schedules PUSCH/PUCCH. To this end, another DL carrier may indicate the UL BWP, and the network may select the same BWP between different DL carriers.

If the cell transfers a PUCCH, a PUCCH offset may be changed according to change of the UL BWP. Accordingly, if a different DL carrier indicates a different UL BWP at a different time, confusion of the PUCCH resource may be caused. For example, when two UL BWPs are configured and two DL carriers may dynamically indicate switch of a UL BWP, the first DL carrier indicates the UL BWP to switch from a UL BWP 1 to a UL BWP 2, and the UE may fail to receive a corresponding command. In this case, if the second DL carrier transmits a PDSCH, it is ambiguous which PUCCH resource is used. Similarly, it is ambiguous that a case where a DL carrier is mapped to a UL carrier with a ratio of one to one. To this end, a network may monitor both of two PUCCH resources or a scheduling DCI for PDSCH may include PUCCH BWP information as resource indicator. That is, a scheduling DCI for PDSCH may be used to switch a UP BWP.

Further, when the UL BWP carrying the PUCCH is changed during accumulation of HARQ-ACK, another issue may occur. For example, DL slots n to n+m may be mapped to an HARQ-ACK of a single PUCCH resource, and a UL BWP carrying the PUCCH may be changed in a middle of DL slots n to n+m. In this case, switch of the UL BWP carrying a PUCCH during accumulation of HARQ-ACK in a plurality of slots may not be allowed. A UL BWP for a new PUCCH during accumulation of HARQ-ACK in a plurality of slots may be used, and a resource selected for a previous UL BWP may be ignored. A DCI of the new UL BWP may include a new resource.

Since the UE may fail to receive a switch command of the UL BWP, the following may be considered in this case. First, when a different resource is selected by a DCI different from a previous DCI with respect to the same PUCCH time resource (i.e. among a DCI scheduling a PDSCH among the same PUCCH time resources), a new resource may be selected. If the UE fails to receive a new resource indication, information on an existing UL BWP may be used. If the UE receives a switch command of the UL BWP after a DCI scheduling the PDSCH, a resource indicated in a corresponding DCI may be used for the new UL BWP. A UL BWP carrying the PUCCH and a resource may be dynamically indicated. In this case, this may be used to activate the new UL BWP. A DCI indicating a different UL BWP may not be multiplexed in the same PUCCH. A configuration of a new UL BWP may be always used.

Meanwhile, the above description is applicable to other cases including a case of mapping the DL carrier to the UL carrier with a ratio of 1 to 1.

(2) When One DL Carrier Includes an Associated SUL Carrier, and Only One of the SUL Carrier or the UL Carrier in the Same Band as that of the DL Carrier May be Activated In order to efficiently support switch of the carrier, a plurality of BWPs may be configured with respect to each UL carrier, and one BWP may be activated/inactivated. For a BWP configuration, a common PRB indexing for the SUL carrier may be performed. For example, information on a center or a reference point of the SUL carrier and information on an offset between the smallest PRBs (virtual PRB) from a center or a reference point of the SUL carrier may be indicated, and a common PRB indexing for the SUL carrier may be performed based thereon. If the UL BWP is changed, the PUCCH resource may be also changed. It may be assumed that the default UL BWP is a UL BWP used for a RACH procedure. The default BWP may be reconfigured afterward or the default BWP may be changed according to a PRACH trigger in another carrier or another UL BWP. With respect to each UL BWP, a PRACH resource used for at least PRACH trigger may be configured. The trigger message may include a BWP index to switch the UL BWP. The UE may perform a RACH procedure at a new initial/default UL BWP afterward. That is, the default UL BWP may be semi-statically or dynamically changed based on the RACH procedure. Necessary information associated with a cell ID used at the SUL carrier and a UL carrier in the same band as that of the DL carrier may be same as if the SUL carrier and the UL carrier is included in different BWPs but in the same carrier. That is, UL BWP switch between the SUL carrier and a UL carrier having the same band as that of the DL carrier may be used for switch between two UL carriers. In order to support a more robust system performance, a PUCCH carrier/cell and a PRACH carrier/cell may be included in the same carrier. That is, the UE performs the PRACH and a default UL BWP transmitting the PUCCH may be configured in the same UL carrier. That is, with respect to at least PCell, a PUCCH may not be configured in a carrier/cell to which the PRACH is not transmitted. In a case of the SCell, the PUCCH may be configured between 2 UL carriers.

(3) When One DL Carrier Includes an Associated SUL Carrier, and Both of a SUL Carrier and a UL Carrier Having the Same Band as that of a DL Carrier May be Activated This case may be regarded as a UL CA including a single DL carrier or a DL CA. In this case, there is a need to support activation of the UL carrier, and activation of the UL carrier may be performed by carrier activation/inactivation. A different carrier may include only a DL carrier, only a UL carrier, or a paired DL/UL carrier. In order to support PRACH transmission at a SUL carrier, upon activation of the carrier, the paired DL/UL carrier and a UL dedicated carrier may be activated. At least one activated UL BWP may be configured in the paired DL/UL carrier and the UL dedicated carrier. The paired DL/UL carrier does not mean a paired spectrum. In a case of a non-paired spectrum, the paired DL/UL carrier is located at the same frequency. After the activation, the UE may transmit a PRACH in an SUL carrier. In a PCell, the UE starts transmission of the PRACH in the SUL carrier, the SUL carrier may be automatically activated together with the paired UL carrier. Or, upon activation of the carrier, one of two UL carriers may be selected. Only a selected UL carrier according to an activation message may be activated. Next, according to an explicit indication, an additional UL carrier may be activated. In the PCell, this may mean a UL carrier is an activated a UL carrier including a UL BWP in which PRACH transmission is initiated. Alternatively, upon activation of the carrier, if a PRACH configuration for a SUL carrier and a non-SUL carrier is given, the UL BWP may be activated in both of the SUL carrier and the non-SUL carrier. The above procedure is applicable to an initial UL BWP at the PCell.

When only one UL carrier to which the PRACH is transmitted (i.e. the second case), if a UL carrier transmitting the PUCCH is configured to be different from a UL carrier transmitting the PRACH, the network may indicate the UL BWP to be activated for PUCCH transmission in a PUCCH carrier configuration. The UL BWP indicated in the PUCCH carrier configuration may be activated. If a UL carrier transmitting the PUCCH is configured to be different from a UL carrier transmitting the PRACH, an initial UL BWP configured by an RMSI or a higher layer may be activated in the PUCCH carrier configuration. The activated UL BWP may be changed by RRC reconfiguration or DCI switching.

If a non-paired DL/UL carrier and an SUL carrier are configured in one cell, BWP switching for the SUL carrier may be performed through a UL grant for the SUL carrier. If dynamic PUSCH change is not configured and a SUL carrier is selected as a PUCCH carrier, only DL BWP switching may be possible with respect to a non-paired DL/UL carrier regardless of a BWP pair.

There is a need to clearly define whether a PUCCH resource is also adapted when the UL BWP is adapted. To this end, the following may be considered.

A UL BWP carrying a PUCCH may always be configured based on a UL BWP configuration. When a plurality of UL BWP configurations is provided for UL BWPs including an initial/default UL BWP, different PUCCH resources may be configured per different UL BWP configuration. This may be similar to a case where a CORESET in a DL BWP may be configured per each DL BWP.

A UL BWP carrying a PUCCH may always be configured separately from a UL BWP carrying a PUSCH. The UE may ensure that a full bandwidth including a UL BWP carrying a PUCCH and a UL BWP carrying a PUSCH is included in UE capability. Accordingly, the UE may be configured/indicated to switch the UL BWP carrying the PUCCH, which may not request to switch the PUCCH resource. This is supported from a current CA, the UE is configured with a UL BWP in a SCell having no PUCCH resource, and a PUCCH is transmitted from a PCell. Similarly, in the PCell, the PUCCH and the PUSCH may be configured by different UL BWPs. In this case, the activated UL BWP may be defined as a UL BWP carrying a PUSCH instead of a UL BWP carrying a PUCCH.

It may be also configured whether each UL BWP includes only a PUCCH, only a PUSCH, only the PUCCH and the PUSCH, or all of PUSCH/PRACH/sounding reference signal (SRS). That is, which signal is transmitted may be configured in the configured UL BWP, and a plurality of BWPs may be configured.

A set of approachable PRBs by resource allocation may be configured as well as a UL BWP available for PUCCH/PUSCH transmission. For example, one UL BWP may be configured to have 20 MHz for PUCCH diversity, and scheduling may be achieved at only 5 MHz. In order to reduce scheduling overhead, it may be considered to separately configure a PUSCH PRB zone.

Signaling suggested in the above description may be transmitted through a common signaling such as RMSI/on-demand SI (OSI) or UE specific signaling and/or DCI. In some cases, a different signaling may be used. In particular, a different signal may be used depending on how to define a cell.

7. BWP Reconfiguration

When the UE supports only one BWP or the UE is reconfigured through an RRC, RRC ambiguity may occur. In order to minimize RRC ambiguity, the following may be considered.

(1) When an RRC message is transmitted to change the BWP, a corresponding RRC message may include both of a DL BWP and a UL BWP, and further include an execution time point of the configuration. Before the execution time point, the network may perform retransmission in order to increase reliability.

(2) In order to minimize ambiguity, the network may consider that a new configuration is executed after receiving approval from the UE. In this case, if the network fails approval, the ambiguity may be caused. The network may retransmit an RRC message in a previous BWP and a current activated BWP in order to increase reliability.

(3) A new configuration may be executed immediately after the UE receives a corresponding configuration. The new configuration may be executed after the RRC message is scheduled and after K slot (or k ms)(e.g. 20 ms from an RRC message). Ambiguity may be processed by a network. For example, the network may transmit a plurality of messages and control signals in a previous BWP and a current activated BWP.

(4) When reconfiguring the activated BWP, a CORESET in which a fallback DCI is scheduled may not be changed. That is, a newly activated BWP may include at least one CORESET sharing with a previously activate BWP. In the shared CORESET, resource allocation may be limited to the same as that of a previous BWP.

8. RAR CORESET

It may be considered to separately configure a CORESET for an RAR different from an RMSI CORESET by taking into consideration a beam side. If separate CORESETs are configured for the RMSI and the RAR, a RMSI CORESET may be called CORESET 0, and a RAR CORESET may be called CORESET 1. The CORESET 1 of index 1 may be defined as a special CORESET which may be reused after RRC connection. Monitoring SIB/paging may be reconfigured as a CORESET 1 by an RRC configuration. A CORESET 1 for RAR configured in an initial DL BWP may have following characteristics.

For a configuration of the CORESET 1, frequency domain information may be configured. When the frequency domain information is not usable, the same frequency domain at that of CORESET 0 may be used for CORESET 1. However, unlike CORESET 0, a resource block group (RBG) may be configured based on a common PRB indexing on the basis of information on a reference PRB 0 signaled at the RMSI. Since a partial PRB of first and/or final frequency domains is smaller than a complete 6 PRB, for convenience, a corresponding fragmented PRB may not be used as the CORESET 1. When the bitmap is provided, a bitmap of the size including only a complete 6 PRB in an initial DL BWP may be indicated. Unless indicated otherwise, information on a QCL may be the same as the CORESET 0. Information on a duration of the CORESET 1 may be explicitly configured.

Unless explicitly configured otherwise, a resource element group (REG) bundle size, pre-coder granularity may follow a configuration of the CORESET 0. An interleaver size according to a reduced PRB size due to a fragmented PRB may substantially be 2. The interleaver size may be configured to be arranged.

A DM-RS sequence may be created based on a common PRB indexing for the CORESET 1.

The UE may not simultaneously monitor the CORESET 0 and the CORESET 1. Accordingly, after the RRC connection, the UE may be configured with a group of RNTIs monitored from a search space set associated with the CORESET 1. If the CORESET 1 is configured once, the UE may monitor SI and paging in a corresponding CORESET 1. That is, only an initial SIB according to beam sweeping may be scheduled at the CORESET 0, and remaining common data may be scheduled by the CORESET 1.

Unless indicated otherwise, if the CORESET 1 is configured, the UE may monitor a UE specific RRC message such as Msg 4 in the CORESET 1 instead of the CORESET 0. After RRC connection, this may be reconfigured.

In perspective of PRB indexing and PRB grouping, the CORESET 1 may be handled differently from the CORESET 0. In this case, a CORESET configured by an SS block and/or an RMSI may be specially handled. It may be preferred to use a local PRB indexing only before a common PRB indexing is allowed. Accordingly, if a PRB 0 is indicated in a RMSI, a CORESET configured by RMSI and/or UE specific signaling may follow a common PRB indexing.

When a CORESET 0 collides with a CORESET 1 by simultaneously monitoring the same search space, the UE may omit monitoring of the CORESET 0. That is, if the CORESET 1 is configured once, the UE may not be requested to monitor the CORESET 0.

If the UE is in an idle state, the UE may return an initial DL BWP. Since a paging search space is associated with the CORESET 0, the UE may monitor a search space associated with the CORESET 0. If the UE starts a RACH procedure in an idle state, the UE may monitor the CORESET 1.

UE monitoring may be considered as follows.
UE in RRC idle state: initial DL BWP and CORESET 0
UE for performing a RACH procedure at a DL BWP: CORESET 1 and, if necessary, CORESET 0 for and paging/SI Before reconfigured as another BWP or another CORESET, the UE may regard a CORESET 1 as a default CORESET for C-RNTI, semi-persistent scheduling (SPS), or transmit power command (TPC). In this case, a UE specific RNTI or a group specific RNTI may be monitored. Further, without explicit indication of an RNTI after reception of Msg 4, system information RNTI (SI-RNTI) or paging RNTI (P-RNTI) may be monitored at a CORESET 1.

Figure 10:
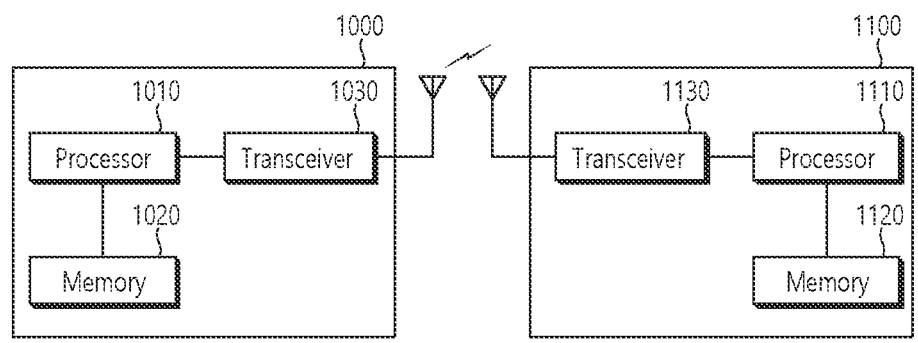
FIG. 10 shows a block diagram of a wireless communication system to implement an embodiment of the present invention.

FIG. 10 shows a block diagram of a wireless communication system to implement an embodiment of the present invention.

An UE 1000 includes a processor 1010, a memory 1020, and a transceiver 1030. The memory 1020 is operatively coupled with the processor 1010 and stores a variety of information to operate the processor 1010. The transceiver 1030 is operatively coupled with the processor 1010, and transmits and/or receives a radio signal to and from the network node 1100. The processor 1010 may be configured to implement proposed functions, procedures and/or methods described in this description. In detail, the processor 1010 may perform steps S800 to S810 in FIG. 8 or control the transceiver 1030 to perform the steps.

A network node 1100 includes a processor 1110, a memory 1120, and a transceiver 1130. The memory 1120 is operatively coupled with the processor 1110 and stores a variety of information to operate the processor 1110. The transceiver 1130 is operatively coupled with the processor 1110, and transmits and/or receives a radio signal to and from the UE 1000.

The processors 1010, 1110 may include application-specific integrated circuit (ASIC), other chipset, logic circuit and/or data processing device. The memories 1020, 1120 may include read-only memory (ROM), random access memory (RAM), flash memory, memory card, storage medium and/or other storage device. The transceivers 1030, 1130 may include baseband circuitry to process radio frequency signals. When the embodiments are implemented in software, the techniques described herein can be implemented with modules (e.g., procedures, functions, and so on) that perform the functions described herein. The modules can be stored in memories 1020, 1120 and executed by processors 1010, 1110. The memories 1020, 1120 can be implemented within the processors 1010, 1110 or external to the processors 1010, 1110 in which case those can be communicatively coupled to the processors 1010, 1110 via various means as is known in the art.

Figure 11:
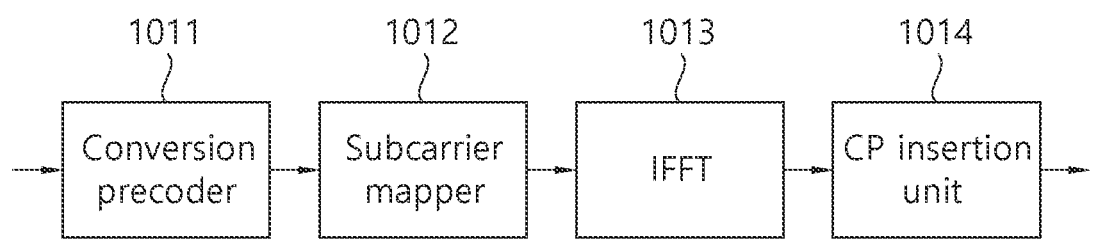
FIG. 11 illustrates a processor of a UE shown in FIG. 10.

FIG. 11 illustrates a processor of a UE shown in FIG. 10. The processor 1010 of the UE includes a conversion precoder 1011, a subcarrier mapper 1012, an inverse fast Fourier transform (IFFT) unit and a cyclic prefix (CP) insertion unit.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a base station (BS) in a wireless communication system, the method comprising:
   processing a reference signal for a transmission of the reference signal;
   transmitting, to a wireless device, the reference signal; and
   transmitting, to the wireless device, data related to the reference signal via a bandwidth specified to the wireless device,
   wherein, in a case where a resource block (RB) indexing for a system bandwidth is used for processing the reference signal: the reference signal is processed for the transmission of the data based on the RB indexing for the system bandwidth,
   wherein, in a case where the RB indexing for the system bandwidth is unused for processing the reference signal: the reference signal is processed for the transmission of the data based on an RB indexing for a partial frequency region in the system bandwidth, and
   wherein the system bandwidth is wider than the bandwidth specified to the wireless device.

2. The method of claim 1, further comprising:
   transmitting, to the wireless device, information regarding an offset between a synchronization signal (SS) block and a system bandwidth through the SS block.

3. The method of claim 2, wherein the information regarding the offset comprises information regarding an offset between (i) a physical resource block (PRB) of a lowest index of the SS block and (ii) a PRB of a lowest index of the system bandwidth.

4. The method of claim 2, wherein the information regarding the offset comprises information regarding an offset between (i) a subcarrier 0 of the SS block and (ii) a subcarrier 0 of the system bandwidth.

5. The method of claim 2, wherein the information regarding the offset comprises information regarding an offset between (i) a center of the SS block and (ii) a center of the system bandwidth.

6. The method of claim 2, wherein the SS block further comprises information regarding the system bandwidth.

7. The method of claim 6, wherein the information regarding the system bandwidth comprises information regarding a potential maximum bandwidth in which a carrier is operated.

8. The method of claim 2, wherein the SS block is comprised in an initial uplink (UL) bandwidth part (BWP).

9. The method of claim 2, wherein the information regarding the offset is expressed as a value of a channel raster or a synchronization raster.

10. A base station (BS) configured to operate in a wireless communication system, the BS comprising:
    a memory;
    a transceiver; and
    at least one processor, operably coupled to the memory and the transceiver, and configured to:
    process a reference signal for a transmission of the reference signal;
    control the transceiver to transmit, to a wireless device, the reference signal; and
    control the transceiver to transmit, to the wireless device, data related to the reference signal via a bandwidth specified to the wireless device,
    wherein, in a case where a resource block (RB) indexing for a system bandwidth is used for processing the reference signal: the reference signal is processed for the transmission of the data based on the RB indexing for the system bandwidth,
    wherein, in a case where the RB indexing for the system bandwidth is unused for processing the reference signal, the reference signal is processed for the transmission of the data based on an RB indexing for a partial frequency region in the system bandwidth, and
    wherein the system bandwidth is wider than the bandwidth specified to the wireless device.

11. The BS of claim 10, wherein the transceiver is further configured to control the transceiver to transmit, to the wireless device, information regarding an offset between a synchronization signal (SS) block and a system bandwidth through the SS block.

12. The BS of claim 11, wherein the information regarding the offset comprises information regarding an offset between (i) a physical resource block (PRB) of a lowest index of the SS block and (ii) a PRB of a lowest index of the system bandwidth.

13. The BS of claim 11, wherein the information regarding the offset comprises information regarding an offset between (i) a subcarrier 0 of the SS block and (ii) a subcarrier 0 of the system bandwidth.

14. The BS of claim 11, wherein the information regarding the offset comprises information regarding an offset between (i) a center of the SS block and (ii) a center of the system bandwidth.

15. The BS of claim 11, wherein the SS block further comprises information regarding the system bandwidth.

16. The BS of claim 15, wherein the information regarding the system bandwidth comprises information regarding a potential maximum bandwidth in which a carrier is operated.

17. The BS of claim 11, wherein the SS block is comprised in an initial uplink (UL) bandwidth part (BWP).

18. The BS of claim 11, wherein the information regarding the offset is expressed as a value of a channel raster or a synchronization raster.

* * * * *